(12) United States Patent
Krisiloff et al.

(10) Patent No.: US 12,518,012 B2
(45) Date of Patent: Jan. 6, 2026

(54) STRUCTURE-AWARE NEURAL NETWORKS FOR MALWARE DETECTION

(71) Applicant: Google LLC, Mountain View, CA (US)

(72) Inventors: David Benjamin Krisiloff, Arlington, VA (US); Scott Eric Coull, Cary, NC (US)

(73) Assignee: GOOGLE LLC, Mountain View, CA (US)

( * ) Notice: Subject to any disclaimer, the term of this patent is extended or adjusted under 35 U.S.C. 154(b) by 151 days.

(21) Appl. No.: 18/490,141

(22) Filed: Oct. 19, 2023

(65) Prior Publication Data

US 2025/0131092 A1  Apr. 24, 2025

(51) Int. Cl.
   *G06F 21/00* (2013.01)
   *G06F 21/56* (2013.01)

(52) U.S. Cl.
   CPC ...... *G06F 21/566* (2013.01); *G06F 2221/034* (2013.01)

(58) Field of Classification Search
   None
   See application file for complete search history.

(56) References Cited

U.S. PATENT DOCUMENTS

| 8,424,091 | B1* | 4/2013 | Su | H04L 51/212 |
| | | | | 713/188 |
| 9,705,904 | B1* | 7/2017 | Davis | G06N 3/045 |
| 11,108,809 | B2 | 8/2021 | Johns et al. | |
| 11,637,859 | B1 | 4/2023 | Johns et al. | |
| 11,689,567 | B2* | 6/2023 | Gadhe | H04L 63/20 |
| | | | | 726/22 |
| 11,720,686 | B1* | 8/2023 | Cross | G06F 9/455 |
| | | | | 726/25 |
| 12,118,087 | B2* | 10/2024 | Vukmirovic | G06N 20/00 |
| 2017/0262633 | A1* | 9/2017 | Miserendino | G06N 5/025 |
| 2018/0063169 | A1* | 3/2018 | Zhao | H04L 63/1416 |
| 2018/0278647 | A1* | 9/2018 | Gabaev | H04L 63/1425 |
| 2020/0218807 | A1* | 7/2020 | Davis | G06F 21/565 |
| 2022/0318386 | A1* | 10/2022 | Bhosale | G06F 21/552 |
| 2023/0205883 | A1* | 6/2023 | Ulasen | G06F 21/565 |
| | | | | 726/23 |

(Continued)

OTHER PUBLICATIONS

Coull et al., "Activation Analysis of a Byte-Based Deep Neural Network for Malware Classification", arXiv:1903.04717v2, Mar. 20, 2019, 7 pages.

(Continued)

*Primary Examiner* — Maung T Lwin
(74) *Attorney, Agent, or Firm* — DORITY & MANNING P.A.

(57) ABSTRACT

Provided is a malware detection system that provides structure-aware neural networks for performing malware detection. In particular, rather than treat the entire computer file as one large input to a deep neural network, the malware detection system can break the file up based on the internal file structure. Each portion of the computer file can then be processed using individual neural networks and the outputs of these networks can be combined and similarly processed. In this way the overall system can evaluate the file with knowledge of the structure of the file, enabling the malware detection to have a higher-order understanding of the interoperation of different portions of the computer file.

20 Claims, 8 Drawing Sheets

(56) References Cited

U.S. PATENT DOCUMENTS

| | | | | |
|---|---|---|---|---|
| 2023/0353595 | A1* | 11/2023 | Hu | G06N 3/045 |
| 2024/0004993 | A1* | 1/2024 | Rozenberg | G06F 21/554 |
| 2024/0232349 | A1* | 7/2024 | Briliauskas | G06F 21/566 |
| 2024/0256666 | A1* | 8/2024 | Bolocan | G06F 21/566 |
| 2025/0045393 | A1* | 2/2025 | Rokka Chhetri | G06F 21/566 |

OTHER PUBLICATIONS

Fleshman et al., "Non-Negative Networks Against Adversarial Attack", arXiv:1806.06108v2, Jan. 3, 2019, 12 pages.

Ghouti et al., "Malware Classification Using Compact Image Features and Multiclass Support Vector Machines", IET Information Security, vol. 14, Issue 4, May 15, 2020, 11 pages.

Krcal et al., "Deep Convolutional Malware Classifiers Can Learn from Raw Executables and Labels Only", Workshops at the International Conference on Learning Representations, Vancouver, Canada, Apr. 30-May 3, 2018, 4 pages.

Kumar et al., "DTMIC: Deep Transfer Learning for Malware Image Classification", Journal of Information Security and Applications, vol. 64, Feb. 1, 2022, 12 pages.

Makandar et al., "Malware Class Recognition Using Image Processing Techniques", 2017 International Conference on Data Management, Analytics and Innovation, Pune, India, Feb. 24-26, 2017, 5 pages.

Park, "A Vision Transformer Enhanced with Patch Encoding for Malware Classification", Intelligent Data Engineering and Automated Learning—IDEAL 2022, 2022, p. 289-299.

Raff et al., "Classifying Sequences of Extreme Length with Constant Memory Applied to Malware Detection", arXiv:2012.09390v1, Dec. 17, 2020, 14 pages.

Raff et al., "Malware Detection by Eating a Whole Exe", arXiv:1710.09435v1, Oct. 25, 2017, 13 pages.

Su et al., "Lightweight Classification of IoT Malware Based on Image Recognition", arXiv:1802.03714v1, Feb. 11, 2018, 7 pages.

Venkatraman et al., "A Hybrid Deep Learning Image-Based Analysis for Effective Malware Detection", Journal of Information Security and Applications, vol. 47, Jan. 31, 2020, 23 pages.

Vu et al., "HIT4Mal: Hybrid Image Transformation for Malware Classification", Transactions on Emerging Telecommunications Technologies, vol. 31, Issue 11, Nov. 4, 2020, 16 pages.

Bakour et al., "VisDroid: Android Malware Classification Based on Local and Global Image Features, Bag of Visual Words and Machine Learning Techniques", Neural Computing and Applications, vol. 33, Jul. 11, 2020, 21 pages.

Son et al., "An Enhancement for Image-based Malware Classification Using Machine Learning with Low Dimension Normalized Input Images" Journal of Information Security and Applications, vol. 69, Sep. 1, 2022, 20 pages.

\* cited by examiner

STRUCTURE-AWARE NEURAL NETWORKS FOR MALWARE DETECTION

FIELD

The present disclosure relates generally to cybersecurity. More particularly, the present disclosure relates to a cybersecurity system that includes structure-aware neural networks for malware detection.

BACKGROUND

Malware, in the cybersecurity context, can refer to malicious software specifically configured to disrupt, damage, or gain unauthorized access to a computer system. Malware can include a range of malicious program types, including computer viruses, worms, Trojan horses, ransomware, and spyware. Malware can cause significant harm to computer systems by either causing system disruptions, stealing sensitive information, or enabling unauthorized access to system resources, thereby posing a significant security risk.

In the field of cybersecurity, attempts have been made to build and apply machine learning models to detect and neutralize the ever-evolving threat of malware. These attempts can be broadly classified into two categories:

A first approach for applying machine learning models to perform malware detection involves the development of hand-crafted signals or features generated by cybersecurity experts. Specifically, human experts work to define a set of signals or features to be extracted from the computer file under evaluation. The features are often associated with known malicious software. Then, to evaluate a certain computer file, the features can be extracted from the computer file and a machine learning model can operate to generate a malware prediction on the basis of the extracted features. However, the process of expertly creating and curating these features or rules is often time-consuming and costly, requiring significant investment of resources. Moreover, these hand-crafted features might not be robust enough to adapt to the rapidly evolving nature of malware. This limitation is primarily due to the fact that a particular feature that proves helpful in detecting a current malware variant might not be effective against new or modified versions of the malware. Thus, human-defined features are incredibly expensive to create and maintain, and often require adjustment over time (due to drift in the operation of malware) leading to expensive initial investment and long-term upkeep costs.

A second category of malware detection via machine learning seeks to automatically learn the appropriate features to extract and evaluate for malware detection. This type of software utilizes machine learning models that are trained to process the raw bytes of the binary code files associated with a program, thereby identifying potential threats. Past approaches of this type take a naive view of binary code files as a homogenous sequence of bytes-similar to how some systems approach natural language problems. However, binaries are not a natural language and the semantics of the bytes are not easily extracted by processing the binary as a homogenous sequence of bytes. This means that machine learning models of this type might struggle to identify malware if the threat does not directly correlate with the data the model was trained on. This limits their effectiveness in detecting new or modified malware variants.

SUMMARY

Aspects and advantages of embodiments of the present disclosure will be set forth in part in the following description, or can be learned from the description, or can be learned through practice of the embodiments.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a computer-implemented method to perform malware detection. The computer-implemented method also includes obtaining, by a computing system may include one or more computing devices, a computer file to be analyzed for malware detection, where the computer file has a structure. The method also includes parsing, by the computing system, the computer file into a plurality of file portions based on the structure of the computer file. The method also includes respectively processing, by the computing system, the plurality of file portions with a plurality of machine-learned feature extractor models to respectively generate a plurality of feature embeddings respectively for the plurality of file portions. The method also includes processing, by the computing system, the plurality of feature embeddings with a machine-learned prediction model to generate a model prediction for the computer file, where the model prediction is indicative of a malware classification for the computer file. Other embodiments of this aspect include corresponding computer systems, apparatus, and computer programs recorded on one or more computer storage devices, each configured to perform the actions of the methods.

One general aspect includes one or more non-transitory computer-readable media that collectively store instructions. The one or more non-transitory computer-readable media includes instructions for obtaining, by the computing system, a computer file, where the computer file has a structure. The media also includes instructions for parsing, by the computing system, the computer file into a plurality of file portions based on the structure of the computer file. The media also includes instructions for respectively processing, by the computing system, the plurality of file portions with a plurality of machine-learned feature extractor models to respectively generate a plurality of feature embeddings respectively for the plurality of file portions. The media also includes instructions for processing, by the computing system, the plurality of feature embeddings with a machine-learned prediction model to generate an output representation for the computer file. Other embodiments of this aspect include corresponding computer systems, apparatus, and computer programs recorded on one or more computer storage devices, each configured to perform the actions of the methods.

One general aspect includes a computing system to train a machine learning model for malware detection. The computing system includes instructions for obtaining, by the computing system, a computer file, where the computer file has a structure, and where a ground truth label is associated with the computer file. The system also includes instructions for parsing, by the computing system, the computer file into a plurality of file portions based on the structure of the computer file. The system also includes instructions for respectively processing, by the computing system, the plurality of file portions with a plurality of machine-learned feature extractor models to respectively generate a plurality of feature embeddings respectively for the plurality of file portions. The system also includes instructions for processing, by the computing system, the plurality of feature embeddings with a machine-learned prediction model to generate a model prediction for the computer file, where the model prediction is indicative of a malware classification for the computer file. The system also includes instructions for evaluating, by the computing system, a loss function that generates a loss value based on a comparison of the model prediction for the computer file with the ground truth label for computer file. The system also includes instructions for modifying, by the computing system, one or more parameter values of the machine-learned prediction model and the plurality of machine-learned feature extractor models based on the loss function. Other embodiments of this aspect include corresponding computer systems, apparatus, and computer programs recorded on one or more computer storage devices, each configured to perform the actions of the methods.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of implementations directed to one of ordinary skill in the art is set forth in the specification, which makes reference to the appended figures, in which.

Figure 1:
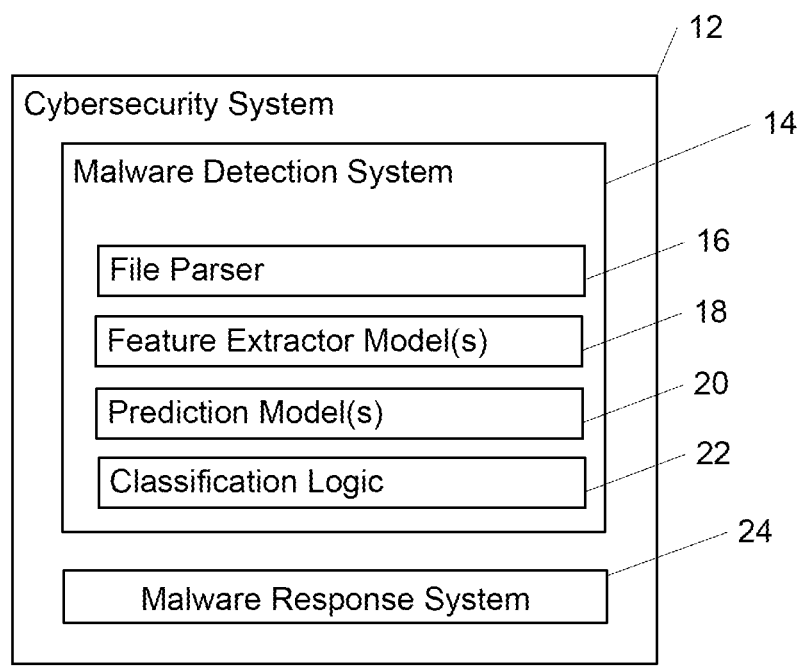
FIG. 1 depicts a block diagram of an example cybersecurity system according to example implementations of the present disclosure.

Reference numerals that are repeated across plural figures are intended to identify the same features in various implementations.

DETAILED DESCRIPTION

Malware, including viruses, worms, ransomware, and spyware, poses a significant cybersecurity risk by disrupting systems, stealing sensitive information, or enabling unauthorized access. Past detection methods that applied machine learning models for malware detection are broadly divided into two categories: Standard practice in machine learning-based detections uses human expert features, which are expensive to create, maintain, and adjust over time due to malware operation drift. A more cost-effective alternative is leveraging machine learning to automatically learn features, though prior approaches naively treated binaries as a homogenous stream of bytes, ignoring the contextual and structural aspects that define byte semantics, which limits the effectiveness of these approaches.

As a solution to these technical challenges, the present disclosure provides a malware detection system that provides structure-aware neural networks for performing malware detection. In particular, rather than treat the entire computer file as one large input to a deep neural network, the malware detection system can break the file up based on the internal file structure. Each portion of the computer file can then be processed using individual neural networks and the outputs of these networks can be combined and similarly processed. In this way the overall system can evaluate the file with knowledge of the structure of the file, enabling the malware detection to have a higher-order understanding of the interoperation of different portions of the computer file. The proposed structure-aware malware detection system can provide improved malware detection and response capabilities, thereby improving the cybersecurity of a corresponding computer network.

More particularly, the malware detection system can obtain a computer file to be analyzed for malware detection. Malware detection refers to the process of identifying, categorizing, and distinguishing different types of malicious software (malware) based on their characteristics, behaviors, or impacts. It aids in the development of effective detection and mitigation strategies.

Malware detection can be performed by analyzing a computer file to determine whether it is malicious. For example, the computer file can be a digital container stored in a file system used for encoding data, including but not limited to binary code, executable programs, text, images, and other forms of software representations. The computer file can serve as a unit of storage that can be created, modified, transmitted, and accessed by computer programs and users, enabling the storage and exchange of data between computers and applications. Examples of computer files that can be analyzed include, but are not limited to, Windows PE (Portable Executable) files, ELF (Executable and Linkable Format) files, PDFs (Portable Document Format), text files, image files such as JPEGs and PNGs, and various script and source code files like JavaScript and Python files.

A computer file typically has a structured format consisting of different portions, each serving a distinct purpose. As one example, a computer file can include a header with metadata such as type and size, and a body containing the actual data or content, which could be further divided into portions like instructions, data, and resources in the case of executables. Some files may have an overlay for additional data and a footer for supporting data integrity or other functionalities. Further, in some cases, the structure of a computer file can include portions that are nested within each other or otherwise hierarchically-organized with multiple hierarchical levels. The structure of a computer file can vary widely based on the file type and is non-limiting, as files can contain other structures or portions based on specific needs or formats. However, the structure of a computer file has significant ramifications on the operation of the computer file. For example, the computer file can have a number of references that extend across different portions of the computer file, and each portion can have its own unique semantics and/or context that alters the meaning of a given sequence of bytes.

In contrast to prior approaches that directly operate over a single sequence of bytes from binary version of a computer file under evaluation, an example malware detection system proposed herein can first parse the computer file into a plurality of file portions based on the structure of the computer file. For example, the malware detection system can parse the computer file by applying a rule-based parsing engine that applies a plurality of user-defined parsing rules. As another example, the malware detection system can use machine learning models to "dissemble" or parse the computer file. In some implementations, the level of the structural parsing can be flexible or dynamically determined. For example, for sections where additional parsing information is available, the malware detection system can parse to provide extremely fine-grained structure while in other areas the malware detection system may perform more coarse-grained parsing.

After parsing the computer file, the malware detection system can respectively process the plurality of file portions with a plurality of machine-learned feature extractor models to respectively generate a plurality of feature embeddings respectively for the plurality of file portions. The machine-learned feature extractor models can be algorithms or computational models trained via machine learning techniques to identify and extract meaningful patterns or 'features' from raw data. The feature embeddings they generate can be numerical representations (e.g., usually in the form of vectors) of the features identified and extracted by the machine-learned feature extractor models. The feature embeddings can encapsulate the essential characteristics or properties of the data in a format that machine learning algorithms can process (e.g., in a low-dimensional latent space).

In some example implementations, each portion of the file can be assigned to a specific class or type. Then, the machine-learned feature extractor model used to process each portion can be a class-specific model that is trained specifically for the portion class assigned to the file portion. By deploying class-specific models, the features extracted from each portion can be higher-quality and contain information more specifically related to the particular class of file portion.

The malware detection system can combine the plurality of feature embeddings respectively generated for the plurality of file portions. The malware detection system can then process the plurality of feature embeddings with a machine-learned prediction model to generate a model prediction for the computer file. The model prediction can be indicative of a malware classification for the computer file. As examples, the model prediction can be a binary or logistic malware classification, a multiclass malware family classification, a functionality classification, or an attribution classification for the computer file.

If the malware detection system determines that the computer file is malware based on the model prediction, then a corresponding malware response system can generate a malware alert and/or perform a malware response action. Such response actions could include, but are not limited to, quarantine or deletion of the infected file, blocking of the malware's communication to its control server, or implementation of patches to rectify system vulnerabilities exploited by the malware. These action(s) can reduce the impact of the malware on an associated computer network, resulting in increased cybersecurity.

The systems and methods of the present disclosure provide a number of technical effects and benefits. As one example, the system significantly improves cybersecurity by providing improved malware detection and response capabilities. Improved malware detection results in increased cybersecurity, which is a technical benefit motivated by technical challenges and represents a significant reduction in risk for computer systems.

As another example technical effect, the proposed malware detection system can operate the parse a computer file into portions and process the portions using advanced machine learning models that can operate in parallel. This parallel operation allows for efficient and expedient analysis of data, which significantly reduces the latency traditionally associated with malware detection systems (e.g., as compared to processing the entire computer file in one continuous sequence). Consequently, threats can be identified and neutralized more swiftly, enhancing the overall security of the system it protects.

As another example technical effect, in some implementations, the malware detection system of the present invention can deploy class-specific models for processing different classes of file portions. These class-specific models may be specifically trained on certain types of data, enabling them to specialize in recognizing and addressing specific cybersecurity threats. As a result, these class-specific models can optionally be smaller in size than general-purpose models whilst providing similar or even superior performance. This reduction in model size presents a significant technical effect: the consumption of less computational resources. By employing smaller, more efficient models, the invention effectively reduces the burden on system resources, freeing up capacity for other computational tasks. This not only improves the overall efficiency of the system but also potentially extends the lifespan of the hardware, resulting in cost savings.

With reference now to the Figures, example implementations of the present disclosure will be discussed in further detail.

FIG. 1 provides a block diagram of an example cybersecurity system 12, in accordance with implementations of the present disclosure. The cybersecurity system 12 is designed as a comprehensive solution for effective malware detection and response. The cybersecurity system 12 integrates several components, including a malware detection system 14 and a malware response system 24.

The malware detection system 14 serves as the primary component responsible for identifying potential malware threats. The malware detection system 14 can include a file parser 16, one or more feature extractor models 18, one or more prediction models 20, and classification logic 22. These components can operate in a coordinated manner to detect potential malware threats.

In some implementations, the malware detection system 14 can be applied to perform static malware analysis of a computer file. In static analysis, the malware detection system 14 can examine the file contents as they exist in a storage medium (e.g., "on disk") without executing the contents of the computer file. As such, it can sometimes be more limited in what it can achieve (e.g., if a portion of the file is encrypted, the scanner will not be able to see its true contents). However, static analysis is also much faster and less resource intensive, and so it is a key part of a defense-in-depth strategy against malware.

Alternatively or additionally, the malware detection system 14 can perform dynamic analysis in which the malware detection system 14 executes the file in some way (e.g., via emulation, or running in a sandbox environment) and examines the actual behavior of the program as it is running. For example, while a computer file is executing, the malware detection system 14 can capture a snapshot of the file as it exists in memory (e.g., as the computer program is executing, decrypting memory segments, etc.). Then, the malware detection system 14 can operate on that memory snapshot in the same way it operates on the file on-disk. While dynamic analysis is more resource intensive and slower, it affords the malware detection system the ability to see the functional activity of the binary (e.g., actually see what an encrypted section does).

Referring still to FIG. 1, the file parser 16 can function to dissect a computer file into multiple file portions based on its structure. The structure of a computer file can be determined by factors such as file type, and can be divided into different sections such as, for example, headers, body, overlays, and footers, each serving a specific function. For instance, a file parser 16 can parse an executable file into sections like text, data, and resource sections. The file parser 16 can employ rule-based parsing engines or machine learning models to parse the computer file with varying degrees of granularity. The granularity of parsing can be dynamically determined based on the available parsing information or specific needs.

Following the parsing operation, the file portions can be processed by one or more feature extractor models 18. These models are machine-learned computational algorithms trained to identify and extract meaningful features or patterns from the raw data of the file portions. The feature extractor models 18 can generate feature embeddings, which are numerical representations of the features identified. The feature embeddings can encapsulate the essential characteristics or properties of the file portions in a format that can be effectively processed by machine learning algorithms.

In some example implementations, the feature extractor models 18 can be class-specific models. These models can be trained to process specific types of file portions. For instance, a specific feature extractor model can be trained to process the header portion of an executable file. This allows for extraction of high-quality features that are more related to the specific class of the file portion, resulting in improved detection accuracy.

The proposed use of class-specific models in the context of malware detection is distinct from the more generic mixture of experts approach typically used in other machine learning applications. In the class-specific models approach as described in the present disclosure, each file portion of a computer file is assigned a specific class or type. Based on this classification, a dedicated class-specific model is then employed to process each file portion. This class-specific model is trained specifically for the particular class of file portion it is assigned to. This allows the feature extraction from each file portion to be of higher quality and contain information that is more specifically related to the particular class of file portion. This approach takes advantage of the fact that different sections of a file or different types of files can have diverse characteristics that are best understood by models specifically trained for them. Furthermore, as described elsewhere herein, these models can be jointly trained to optimize their aggregate performance.

On the other hand, a mixture of experts approach refers to a more generic machine learning technique wherein a set of models or 'experts' is used to tackle different aspects of a problem. However, the experts in a mixture of experts approach are not specialized to specific classes of data within the problem space. Instead, they are designed to handle broad aspects of the problem, based on how the problem space is partitioned. Further, the expert models in a mixture of experts approach are typically trained separately from one another.

Referring still to FIG. 1, once the feature embeddings are generated, they can be processed by one or more prediction models 20. The prediction models 20 are machine-learned models that use the feature embeddings to generate a prediction for the computer file. The prediction model 20 can apply various machine learning techniques, such as deep learning, support vector machines, random forests, or other suitable techniques, to generate a model prediction. The model prediction can indicate a classification of the file, such as whether the file is benign or malicious, the malware family it belongs to, its functionality, or its attribution.

The classification logic 22 can be a software component configured to interpret the model predictions. The interpretation can be binary (malware or benign), multiclass (type of malware), or a functionality classification. Based on the interpretation, the classification logic 22 can classify the computer file and trigger appropriate responses.

The malware response system 24 is configured to respond effectively to identified malware threats. For example, once a computer file is classified as malware by the malware detection system 14, the malware response system 24 can initiate a response action. The response action can include sending a malware alert to the system administrator, quarantining or deleting the infected file, blocking the malware's communication to its control server, or implementing patches to rectify system vulnerabilities exploited by the malware.

In some implementations, the malware response system 24 can be configured to perform automated responses based on predefined rules or policies. For example, if the malware is classified as a ransomware, the malware response system 24 can automatically quarantine the infected file and block its communication channels. In other cases, the malware response system 24 can be configured to request manual intervention from a system administrator or a cybersecurity expert.

Thus, the cybersecurity system 12 can provide an integrated and efficient solution for malware detection and response. It leverages advanced structure-aware machine learning techniques to parse computer files, extract meaningful features, and make accurate predictions about potential malware threats. The system also includes a robust response mechanism to neutralize identified threats, thereby significantly improving the cybersecurity of the computer network it protects.

Figure 2:
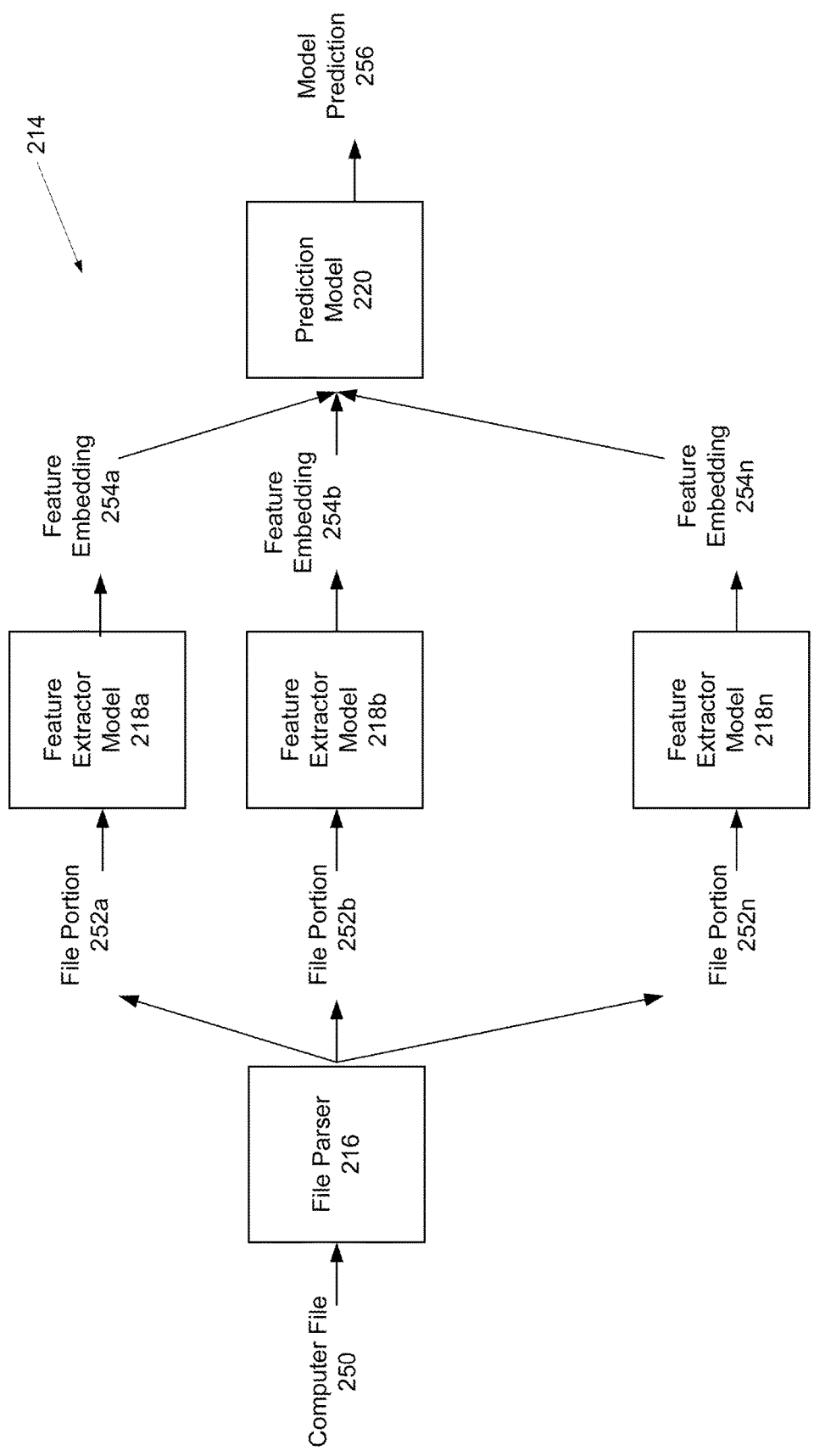
FIG. 2 depicts a block diagram of an example data flow for performing malware detection according to example implementations of the present disclosure.

FIG. 2 provides a graphical illustration of the data flow in a representative implementation of an example malware detection system 214. For example, the malware detection system 214 can be one possible realization of the malware detection system 14 as depicted in FIG. 1. However, it should be noted that the architecture and components of the malware detection system 214 can be varied, and the illustrated example is not meant to be limiting but merely serves as one possible implementation.

In the depicted implementation, the malware detection system 214 first obtains a computer file 250 for analysis. This computer file 250 can be sourced from a variety of locations. For instance, it can be obtained directly from a user's computer, sourced from a network server, or retrieved from a cloud-based storage system. The computer file 250 can be in any file format, including but not limited to .exe, .dll, .sys, .drv, .scr, .ocx, .cpl, .tsp, .ax, .rs, .ovl, .efi, and .fon.

The computer file 250 can possess or exhibit a structure. This structure can be defined by the specific file format and can include various sections, headers, footers, data blocks, and metadata. For example, an executable file (.exe) typically includes a DOS header, PE header, section headers, and section data. Each of these elements has its specific semantic meaning and is used for a particular purpose in the operation of the file.

The malware detection system 214 can parse the computer file 250 into multiple file portions 252a, 252b, 252n based on its structure. The parsing can be performed by a dedicated file parser 216 within the system 214. This file parser 216 can be configured to understand various file formats and can accordingly dissect the files into their constituent parts. For instance, the parsing engine can apply a rule-based approach, where a set of user-defined parsing rules guides the dissection of the computer file 250. These rules can specify how different file formats should be parsed, what sections or elements to look for, and how to handle different data types within the file.

In some implementations, the file parser 216 can employ machine learning techniques to parse the computer file 250. In this scenario, a machine learning model can be trained on a set of labeled data, where each data point is a computer file and the labels correspond to the correct parsing of these files. The trained model can then be used to parse new, unseen computer files 250. This approach can be particularly advantageous when dealing with unfamiliar or custom file formats, as the model can learn to recognize and handle these formats without the need for explicit rules.

In some implementations, the file parser 216 can also assign a portion class to each file portion 252a, 252b, 252n during the parsing stage. This class assignment can be based on the type or content of the file portion. For example, header portions can be assigned to one class, data sections to another class, and so forth. The class assignments can be used to select the appropriate model for processing each file portion, as discussed further elsewhere herein.

Once the computer file 250 has been parsed into file portions 252a, 252b, 252n, these portions are processed by a set of machine-learned feature extractor models 218a, 218b, 218n. Each file portion 252a, 252b, 252n can be processed by a specific model 218a, 218b, 218n. These models can be trained to identify and extract relevant features from the file portions. These features can be numerical or categorical attributes that describe the content, structure, or behavior of the file portions.

In some implementations, each of the machine-learned feature extractor models 218a, 218b, 218n can be a deep learning model, such as a convolutional neural network (CNN). CNNs are particularly suited for processing data with a grid-like structure, such as one-dimensional textual or binary data. As one example, the CNN can apply one or more one-dimensional filters that have a filter size that corresponds to a byte of binary data. A CNN can automatically learn hierarchical feature representations from the raw data, where lower-level features are learned in the early layers of the network, and higher-level, more abstract features are learned in the later layers.

In some implementations, the feature extractor models 218a, 218b, 218n can be class-specific models. These models can be trained specifically for certain classes of file portions, allowing them to specialize in processing and extracting features from these classes. For instance, a header-specific model can be used for processing header portions of the file, while a section-specific model can be used for processing data sections, and so forth. Each class-specific model can be trained on a subset of the data that corresponds to its assigned class, allowing it to develop a deep understanding of the features and patterns that are specific to that class. For example, as will be discussed later with reference to FIG. 4, each class-specific model can be jointly trained with other class-specific models and an aggregation/prediction model in an end-to-end fashion.

After processing the file portions 252a, 252b, 252n, the feature extractor models 218a, 218b, 218n generate corresponding feature embeddings 254a, 254b, 254n. These feature embeddings are condensed numerical representations of the features extracted from the file portions. They effectively encapsulate the essential characteristics or properties of the file portions in a numerical form that can be readily processed by subsequent machine learning algorithms.

These feature embeddings 254a. 254b, 254n are then processed by a machine-learned prediction model 220. In some implementations, the prediction model 220 can be another deep learning model, such as a transformer neural network. Transformer networks are a type of model that uses self-attention mechanisms to weigh the importance of different parts of the input data. This makes them particularly effective for tasks that require understanding the context and relationships within the input data.

The prediction model 220 generates a model prediction 256 for the computer file 250. This prediction can indicate whether the file is believed to be malicious or benign, and can possibly also include a classification of the type of malware (if any) that the file contains. The prediction can be made based on the collective information represented by the feature embeddings 254a, 254b, 254n, allowing the model to consider the entire file structure and content in making its decision.

In some example implementations, the model prediction generated by the machine-learned prediction model 220 can comprise a binary or logistic malware classification for the computer file. In this scenario, the prediction model 220 can be configured to specifically identify whether the computer file is benign or malicious. The model prediction 456 can be a binary value, for instance, '0' or '1', where 'O' may represent a benign file and '1' may represent a malicious file. Alternatively, the prediction model 220 can output a probability score between 0 and 1 that indicates the likelihood of the computer file being malicious. If the score surpasses a specified threshold, the file can be classified as malware. Binary or logistic malware classification can be particularly advantageous in systems where the primary concern is to flag and block any potential threats, regardless of the specific type of malware.

In other example implementations, the model prediction can comprise a multiclass malware family classification for the computer file. In this scenario, the prediction model 220 is designed to not only identify whether a file is malicious, but also to classify the malware into one of several predefined malware families. Each malware family may represent a group of malware that share common characteristics, behaviors, or origins. The model prediction 456 can be a vector of probability scores, each score representing the likelihood of the computer file belonging to a specific malware family. The file can then be classified as the malware family with the highest probability score. Multiclass malware family classification can provide a more granular understanding of the threat landscape, enabling more tailored response actions and facilitating further analysis of malware trends and evolution.

In yet other example implementations, the model prediction can comprise a functionality classification or an attribution classification for the computer file. Functionality classification involves identifying the specific actions or behaviors that a malicious file is designed to perform. For instance, the prediction model 220 can classify malware based on whether they are designed to steal data, cause system disruptions, or create backdoors for unauthorized access. On the other hand, attribution classification involves identifying the potential source or origin of the malware. For example, the prediction model 220 can classify malware based on whether they are likely to originate from certain threat actors, geographical locations, or specific malware campaigns. Both functionality and attribution classifications provide valuable insights that can aid in threat intelligence, forensic investigations, and strategic cybersecurity decision-making.

In yet further implementations, the model prediction 256 generated by the machine-learned prediction model 220, in some implementations, could be a learned representation of the computer file. This learned representation can be a numerical vector, also referred to as an embedding, that represents the underlying structure and semantics of the computer file in a latent embedding space. In the context of the present disclosure, the learned representation or the embedding of the computer file captures the structure and semantics of the file in a compact, dense vector, which can be used for various downstream tasks.

One potential downstream task\ that can be performed with a learned representation or embedding includes similarity search. Similarity search refers to the task of finding items in a database that are similar to a given item. In the context of the present disclosure, similarity search can be used to identify other computer files that are similar to the analyzed computer file based on their learned representations. This can be done by comparing the embedding of the analyzed computer file with the embeddings of other computer files in the database. Similarity between embeddings can be measured using various distance metrics such as Euclidean distance, cosine similarity, or others. Such similarity search can be useful in identifying files that are similar to known malicious files, thereby aiding in malware detection.

Another potential downstream task can be anomaly detection. Anomaly detection refers to the identification of items that do not conform to an expected pattern in a dataset. In the context of the present disclosure, anomaly detection can be used to identify computer files that are significantly different from normal files in terms of their learned representations. Anomalies often correspond to new, unseen variants of malware that are significantly different from known malware families. Thus, anomaly detection can provide a powerful tool for detecting new and emerging threats.

In addition to the above, the learned representation of a computer file can also be used for other downstream tasks such as clustering, visualization, and exploratory data analysis.

Overall, the malware detection system 214 as depicted in FIG. 2 provides a comprehensive and flexible framework for malware detection. By parsing the input file into portions based on its structure and, in some implementations, using a suite of class-specific models to process these portions, the system can effectively handle a wide range of file formats and malware types. Furthermore, by leveraging advanced machine learning techniques such as convolutional and transformer networks, the system can extract high-level, abstract features from the data and make accurate predictions about the presence of malware. The system thus provides a significant improvement over traditional, rule-based malware detection systems, offering greater adaptability, accuracy, and efficiency in detecting and responding to malware threats. As such, the present disclosure marks a significant advancement in the field of cybersecurity, offering robust and effective solutions to the ongoing challenge of malware detection.

Figure 3:
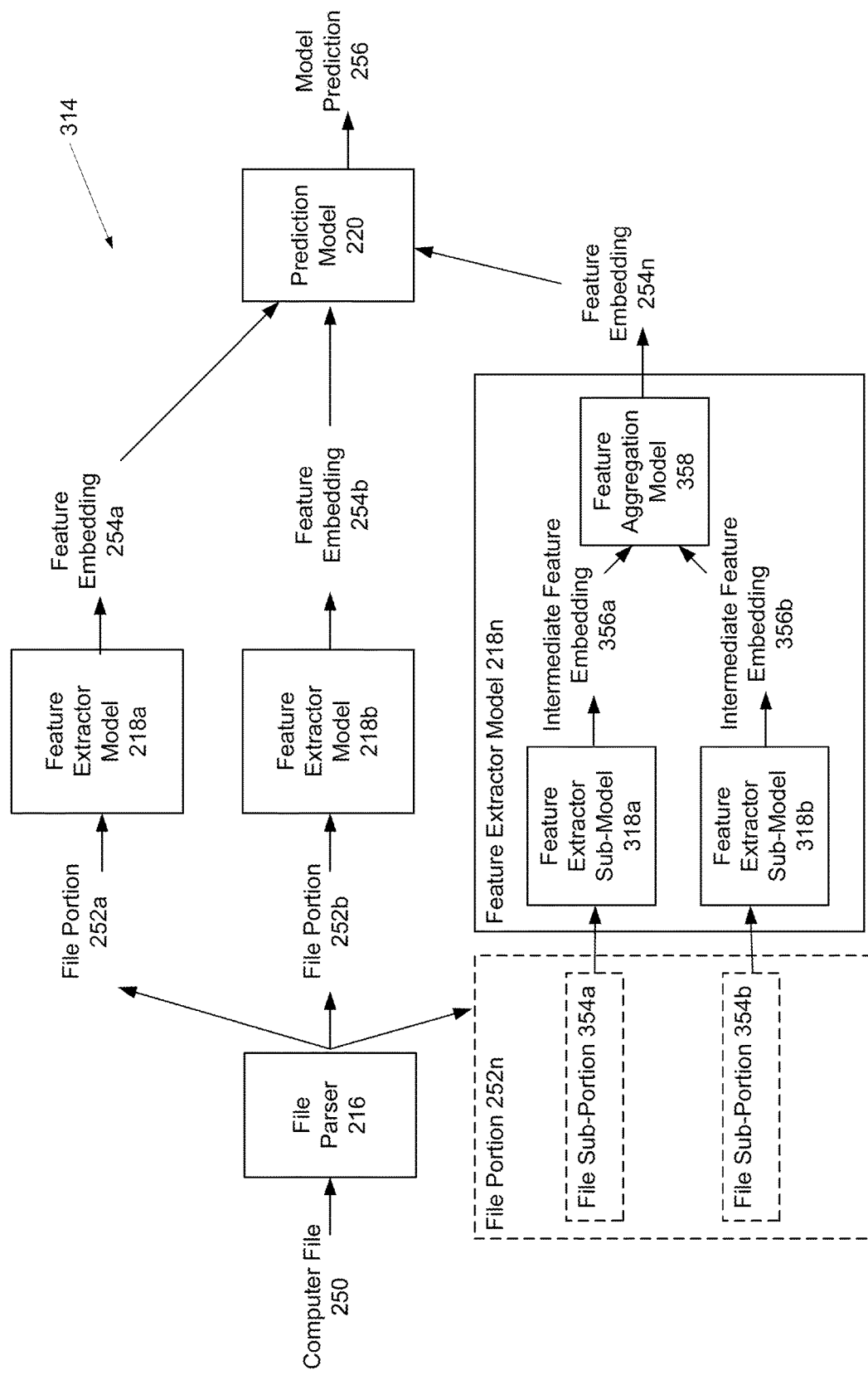
FIG. 3 depicts a block diagram of an example data flow for performing malware detection according to example implementations of the present disclosure.

FIG. 3 depicts a block diagram of another example data flow for performing malware detection according to example implementations of the present disclosure. In particular, FIG. 3 is similar to FIG. 2, except that FIG. 3 shows an example in which a particular file portion 252*n* includes multiple file sub-portions 354*a* and 354*b*. In this setting, the feature extractor model 218*n* that extracts features from the file portion 252*n* can include a hierarchical architecture to hierarchically process the file portion 252*n*. Specifically, the feature extractor model 218*n* can include a feature extractor sub-model 318*a* that processes the file sub-portion 354*a* to generate an intermediate feature embedding 356*a*; a feature extractor sub-model 318*b* that processes the file sub-portion 354*b* to generate an intermediate feature embedding 356*b*; and a feature aggregation model 358 that aggregates the intermediate feature embedding 356*a* and the intermediate feature embedding 356*b* to generate the feature embedding 254*n* for the file portion 252*n*.

More particularly, in this example implementation, a malware detection system 314 (which can be a potential realization of the malware detection system 214 from FIG. 2) takes into account intricacies of the file structure, particularly, the hierarchical structure of a computer file 250. This hierarchy can occur when a portion of a file contains additional sub-portions, each with its own semantics and impacts on file operation.

Once the file sub-portions 354*a* and 354*b* are obtained, they can be processed separately by corresponding feature extractor sub-models 318*a* and 318*b*. These sub-models can be similar or identical to the feature extractor models 218*a*, 218*b*, 218*n* used to process the main file portions 252*a*, 252*b*, 252*n*. Each sub-model 318*a*, 318*b* can be specifically designed or trained to handle a specific type or category of file sub-portion, similar to the class-specific models used in the main file portions. This allows each sub-model to specialize in extracting features from its assigned sub-portion, improving the quality and specificity of the extracted features.

Although two sub-portions 354*a* and 354*b* are illustrated, a file portion can contain any number of sub-portions. The number of sub-portions a file is parsed into can be dynamically determined based on the complexity and size of the file. This allows the system to handle a wide range of file types and sizes, from small, simple files to large, complex ones.

After processing the file sub-portions 354*a* and 354*b*, the feature extractor sub-models 318*a* and 318*b* generate corresponding intermediate feature embeddings 356*a* and 356*b*. These intermediate feature embeddings represent the extracted features of the file sub-portions in a condensed numerical form that can be readily processed by subsequent machine learning algorithms. The intermediate feature embeddings can contain rich information about the content, structure, and behavior of the file sub-portions, providing valuable insights for the subsequent malware prediction.

These intermediate feature embeddings 356*a* and 356*b* are then processed by a feature aggregation model 358. This model can be a type of machine learning model that is configured to combine or aggregate multiple input feature embeddings into a single output feature embedding. The aggregation can be performed in various ways, including but not limited to averaging, weighted averaging, concatenation, or learning a complex function of the inputs.

In some implementations, the feature aggregation model 358 can be a deep learning model, such as a transformer network or a recurrent neural network (RNN). These models are particularly suited for aggregating sequential or ordered data, as they can capture the temporal dependencies or relationships between the inputs. In the context of the malware detection system, the order or sequence of the file sub-portions can carry important information, and using a transformer or RNN for aggregation can help to preserve this information.

The output of the feature aggregation model 358 is the feature embedding 254n for the file portion 252n. This feature embedding encapsulates the collective information represented by the intermediate feature embeddings 356a and 356b. It can thus provide a comprehensive and holistic representation of the file portion 252n, considering all its sub-portions and their relationships.

The malware detection system 314 as depicted in FIG. 3 provides a more comprehensive and nuanced framework for malware detection. By considering the hierarchical structure of the computer file 250, the system can effectively handle a wider range of file formats and malware types. In particular, by facilitating the examination of the computer file 250 at multiple levels of granularity, the malware detection system 314 can provide more robust and accurate malware detection. This is particularly advantageous when dealing with complex or sophisticated malware that may have malicious code hidden within nested structures of a file. Such malware can be difficult to detect using traditional, flat-file scanning approaches. However, by parsing the file into sub-portions and processing each sub-portion separately, the present disclosure can effectively uncover and analyze these hidden structures, thereby enhancing the detection of such complex malware.

Figure 4:
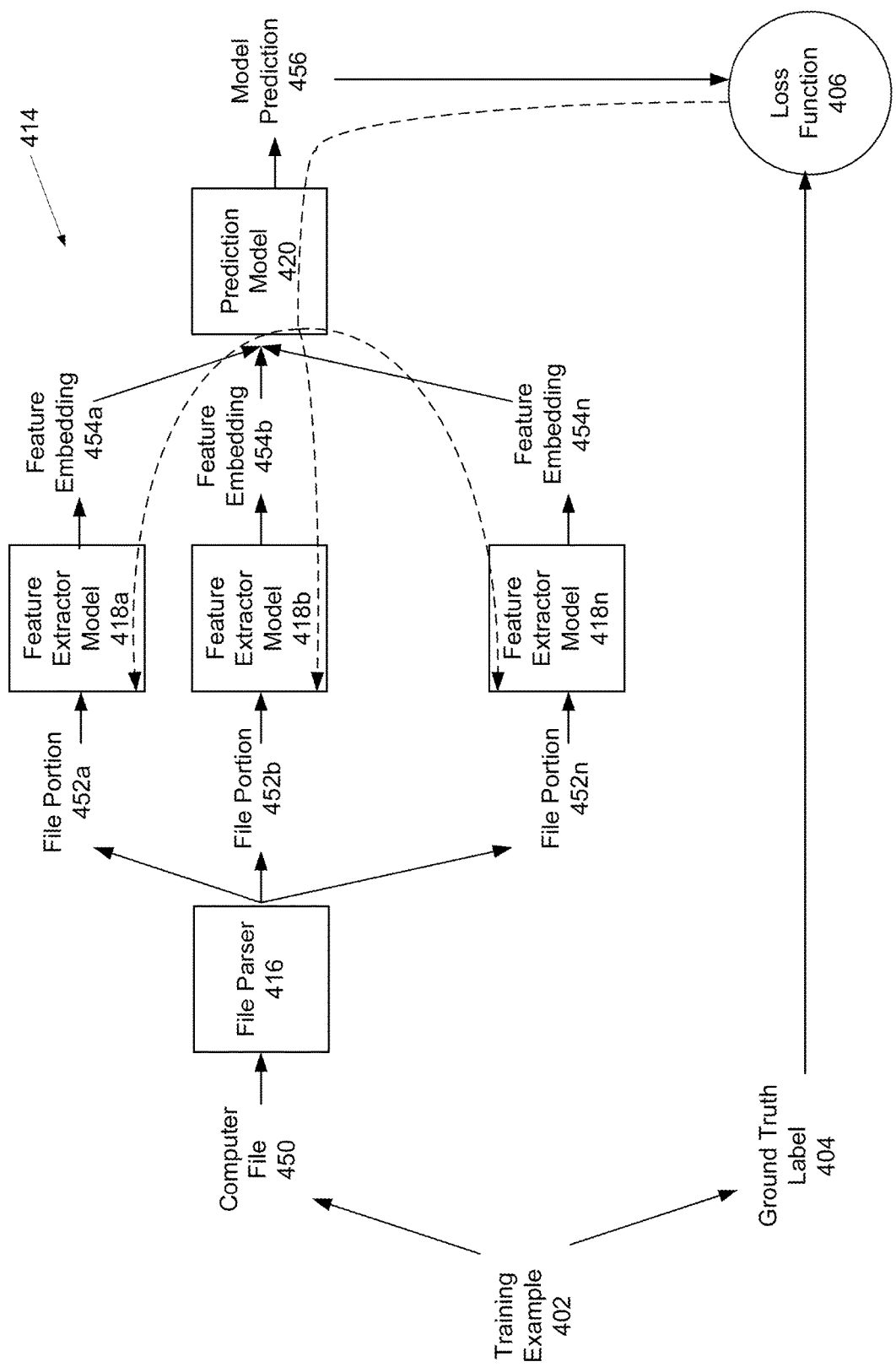
FIG. 4 depicts a block diagram of an example data flow for training malware detection models according to example implementations of the present disclosure.

FIG. 4 depicts a block diagram of an example data flow for training malware detection models according to example implementations of the present disclosure. For example, the approach shown in FIG. 4 can be performed to train the models before they are deployed as shown in FIGS. 2 and/or 3.

In FIG. 4, the malware detection system 414 is depicted obtaining a training example 402. This training example 402 can include a computer file 450 that has been pre-labelled with a ground truth label 404. As one example, the ground truth label 404 can be a binary label that indicates that the computer file 450 is either malicious or benign.

The training example 402 could be sourced from various locations such as, but not limited to, a local computer, a network server, a cloud-based storage system, or a pre-defined database of training examples. This training example can come in a variety of file formats including, but not limited to .exe, .dll, .sys, .drv, .scr, .ocx, .cpl, .tsp, .ax, .rs, .ovl, .efi, and .fon.

In the next step, the malware detection system 414 parses the computer file 450 into multiple file portions 452a, 452b, 452n based on its inherent structure. The file's structure can be defined by its format, which could include various sections, headers, footers, data blocks, and metadata. The parsing can be achieved by a dedicated file parser 416 within the system 414.

After parsing the training example 402 into file portions 452a, 452b, 452n, these portions are processed by a set of machine-learned feature extractor models 418a, 418b, 418n. Each file portion 452a, 452b, 452n can be processed by a specific model 418a, 418b, 418n.

In some implementations, the feature extractor models 418a, 418b, 418n can be class-specific models. These models can be models that are specifically associated with certain class(es) of file portions, allowing them to specialize in processing and extracting features from these classes. For instance, one class-specific model can be used for processing header portions of the file, another model can be used for data sections, and so forth. Each class-specific model can be trained on a subset of the data that corresponds to its assigned class, allowing it to develop a deep understanding of the features and patterns that are specific to that class.

After processing the file portions 452a, 452b, 452n, the feature extractor models 418a, 418b, 418n generate corresponding feature embeddings 454a, 454b, 454n. These feature embeddings are condensed numerical representations of the features extracted from the file portions. They effectively encapsulate the essential characteristics or properties of the file portions in a numerical form that can be readily processed by subsequent machine learning algorithms.

These feature embeddings 454a, 454b, 454n are then processed by a machine-learned prediction model 420. This model can be another deep learning model, such as a transformer neural network. Transformer networks are a type of model that uses self-attention mechanisms to weigh the importance of different parts of the input data. This makes them particularly effective for tasks that require understanding the context and relationships within the input data.

The prediction model 420 generates a model prediction 456 for the training example 402. This prediction can indicate whether the file is believed to be malicious or benign, and can possibly also include a classification of the type of malware (if any) that the file contains. The prediction can be made based on the collective information represented by the feature embeddings 454a, 454b, 454n, allowing the model to consider the entire file structure and content in making its decision.

To improve the accuracy of the model prediction 456, a loss function 406 is evaluated. The loss function 406 can compare the model prediction 456 to the ground truth label 404. For example, the difference between the model prediction 456 and the ground truth label 404 can form a loss value of the loss function 406 that is used to adjust the parameters of the machine-learned models 418a, 418b, 418n and 420.

This loss function 406 can be backpropagated through all the models to perform end-to-end training of the models. This is shown using the dashed lines in FIG. 4. More specifically, end-to-end training in machine learning signifies a process in which a system learns to map raw inputs to desired outputs, optimizing all internal parameters to minimize the difference between the actual output and the expected output. When applied to the context of machine-learned models 418a, 418b, 418n, and 420, end-to-end training means that these models are trained concurrently as an integrated system, rather than being trained separately and then combined. The whole process, from parsing the file to making the final prediction, can be optimized jointly.

One benefit of end-to-end training lies in its potential for enhanced performance. When models are trained separately, the optimization of one model does not take into account the impact on the overall system performance. However, in end-to-end training, each model is optimized with consideration of the overall system performance, which can lead to improved prediction accuracy and generalization performance.

In example implementations that leverage class-specific models, end-to-end training allows for a more harmonized and efficient system. Each class-specific model (e.g., feature extractor models 418a, 418b, 418n) can learn to extract the most relevant and useful features for its assigned class of file portions, while the prediction model 420 can learn to effectively interpret these features in the context of the overall file. As all models are trained simultaneously, they can adapt to each other's strengths and weaknesses during the training process, resulting in a more robust and effective system for malware detection.

Moreover, end-to-end training can be particularly beneficial for class-specific models. This is because these models can learn to extract features that are not only relevant to their assigned class but also useful for the final prediction task. In contrast, if these models were trained separately, they might learn to extract features that are relevant to their assigned class but not necessarily useful for the final prediction task. Therefore, end-to-end training can help ensure that the features extracted by each class-specific model are both class-relevant and prediction-useful, leading to improved malware detection performance.

Thus, through the process illustrated in FIG. 4, the present disclosure allows the malware detection system 414 to learn from pre-labelled examples, enabling the system to improve its detection capabilities over time. This learning process can be performed continuously (e.g., in an online manner) or at specific intervals, allowing the system to adapt to evolving threats and malware variants. By using machine learning techniques and structurally-aware parsing, the present disclosure offers a flexible and robust approach to malware detection, significantly improving upon traditional, rule-based systems.

Figure 5:
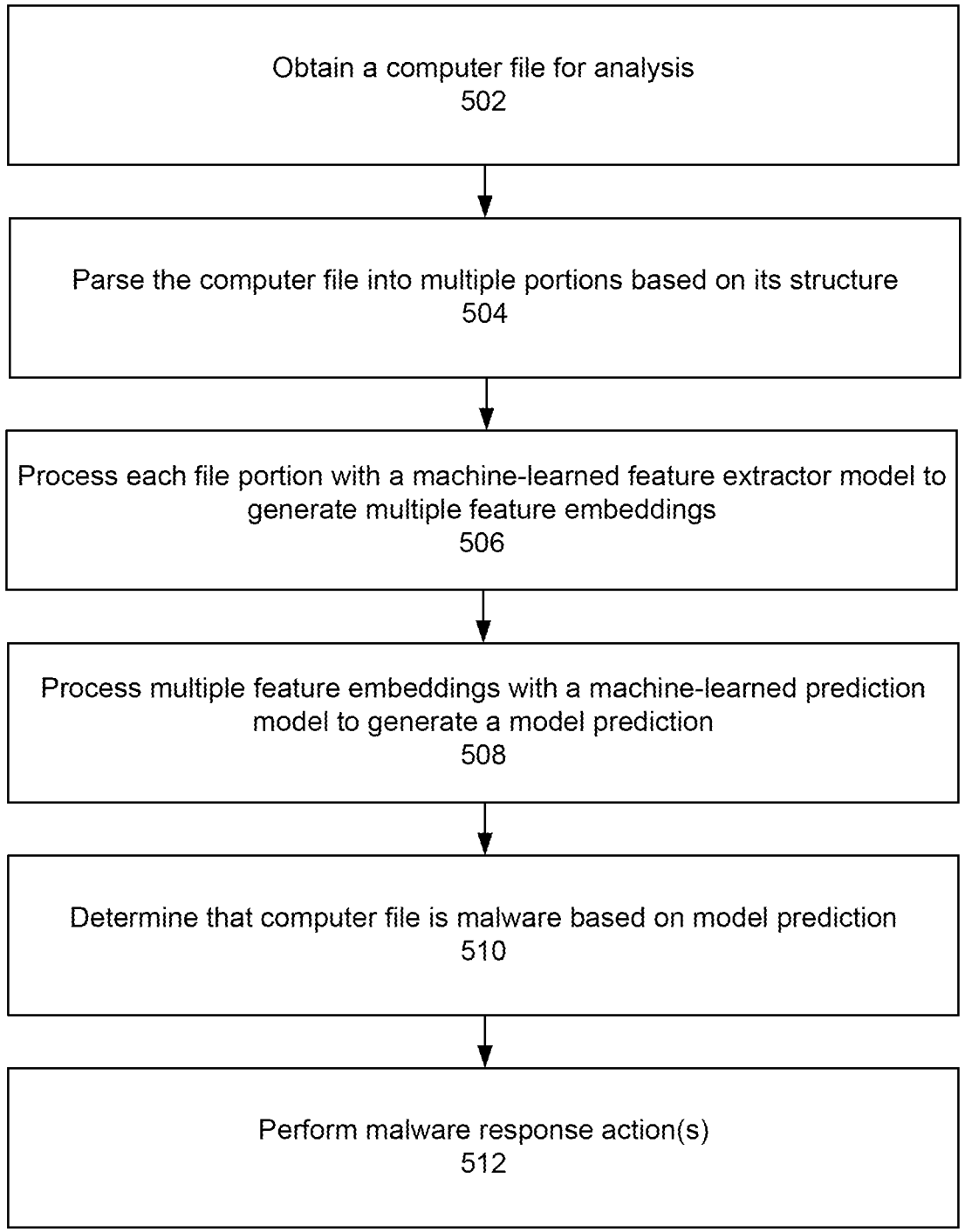
FIG. 5 depicts a flow chart diagram of an example method to perform malware detection according to example implementations of the present disclosure.

FIG. 5 depicts a flowchart of an example process 500 for malware detection. For example, the process 500 can be performed by the cybersecurity system 12 illustrated in and discussed with reference to FIG. 1.

The process begins at step 502, where a computing system, which can include one or more computing devices, obtains a computer file for analysis. This acquisition can be accomplished through multiple means such as manual file uploading, automatic file sourcing from a network, or through a scheduled scanning procedure, for instance. The computer file to be analyzed can be of any type, including but not limited to, executable files, documents, scripts, or any file with a defined structure that can potentially harbor malicious content.

Following the acquisition at step 502, the computing system then proceeds to parse the computer file into multiple file portions based on its structure at step 504. This parsing can be done using various algorithms capable of dissecting files according to their structural elements, such as dividing an executable file into its header, data, and code sections. This step allows for more granular analysis of the file, aiding in robust and accurate malware detection.

The next step in the process, step 506, involves the computing system processing each of these file portions using one or more machine-learned feature extractor models. These models can be trained using supervised, unsupervised, or semi-supervised machine learning techniques on large datasets of benign and malicious files. The models extract key features from the file portions, which can include attributes such as file size, entropy, function calls, or byte sequences, among others. This processing results in a corresponding set of feature embeddings for each file portion, essentially transforming the raw file data into a format that can be efficiently processed by subsequent predictive models.

Step 508 in the process has the computing system processing these feature embeddings using a machine-learned prediction model to generate a model prediction for the entire computer file. The prediction model can be a binary classifier capable of discerning between malware and benign files, or a multi-class classifier capable of identifying specific types of malware. This model can be trained using various machine learning techniques, such as decision trees, neural networks, or support vector machines, among others. The model prediction provides an indication of whether the computer file has been classified as malware or not, based on the analysis of its individual portions.

Finally, if the model prediction determines that the computer file contains malware, as shown in step 510, the computing system will respond in step 512. This response can include a variety of actions. For instance, it can generate an alert to inform a user or a system administrator about the detection of malware. It can also perform a malware response action, such as quarantining or deleting the malicious file, or blocking its execution. The specific response can be customized based on the severity of the threat, the policies of the system, or user preferences.

Figure 6A:
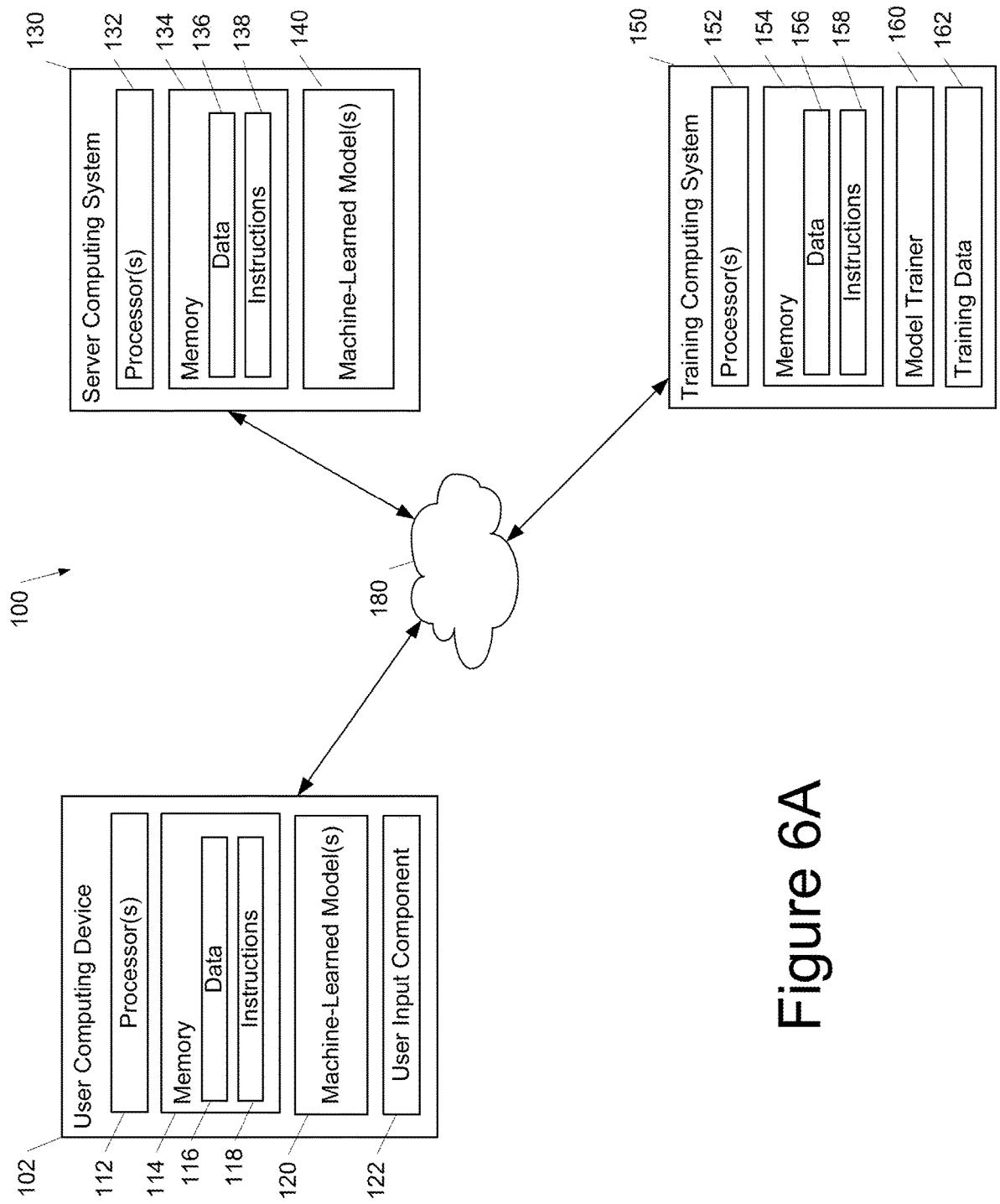
FIG. 6A depicts a block diagram of an example computing system according to example implementations of the present disclosure.

FIG. 6A depicts a block diagram of an example computing system 100 according to example implementations of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models). Example machine-learned models 120 are discussed with reference to FIGS. 1-6.

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120 (e.g., to perform parallel malware detection across multiple instances of different computer files).

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service (e.g., a malware detection service). Thus, one or more models 120 can be stored and implemented at the user computing device 102 and/or one or more models 140 can be stored and implemented at the server computing system 130.

The user computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models). Example models 140 are discussed with reference to FIGS. 1-6.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. The training data 162 can include, for example, pairs of training examples, where each training example includes a computer file and a ground truth malware label for the computer file.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 6A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 6B:
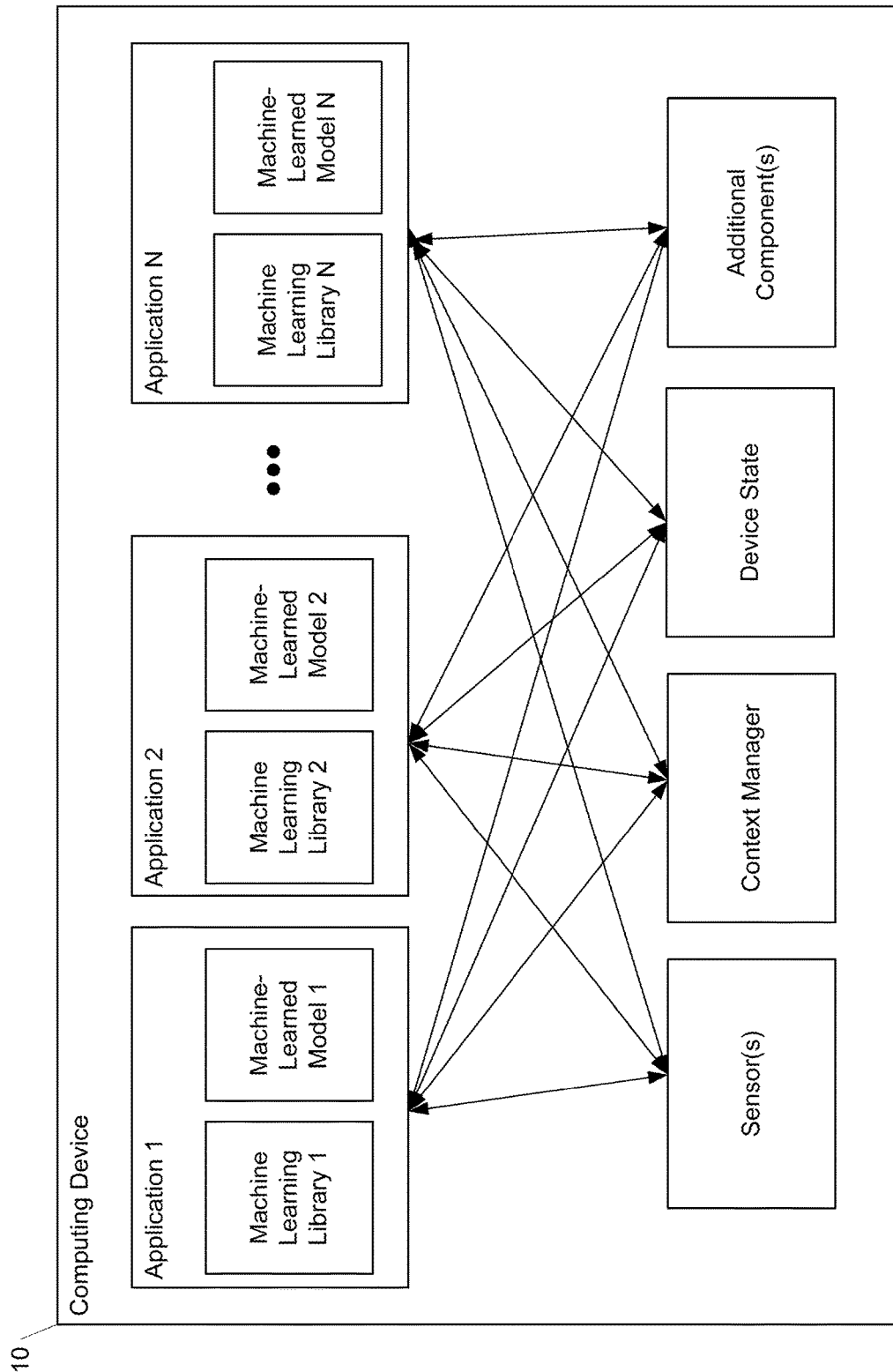
FIG. 6B depicts a block diagram of an example computing device according to example implementations of the present disclosure.

FIG. 6B depicts a block diagram of an example computing device 10 that performs according to example implementations of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 6B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 6C:
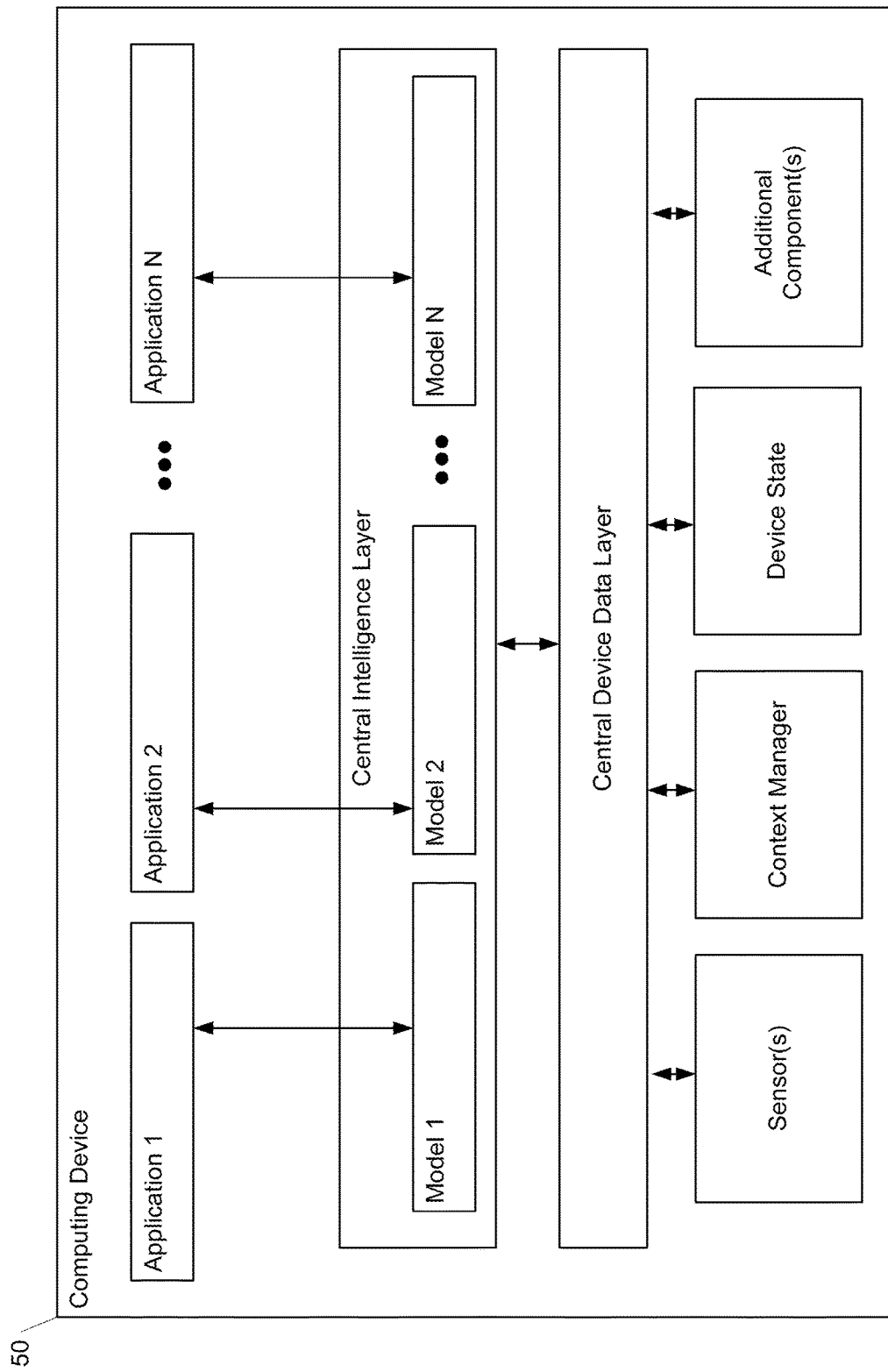
FIG. 6C depicts a block diagram of an example computing device according to example implementations of the present disclosure.

FIG. 6C depicts a block diagram of an example computing device 50 that performs according to example implementations of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 6C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 6C, the central device data layer can communicate with a number of other components of the computing device, such as, for example, one or more sensors, a context manager, a device state component, and/or additional components. In some implementations, the central device data layer can communicate with each device component using an API (e.g., a private API).

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example implementations thereof, each example is provided by way of explanation, not limitation of the disclosure. Those skilled in the art, upon attaining an understanding of the foregoing, can readily produce alterations to, variations of, and equivalents to such implementations. Accordingly, the subject disclosure does not preclude inclusion of such modifications, variations and/or additions to the present subject matter as would be readily apparent to one of ordinary skill in the art. For instance, features illustrated or described as part of one implementation can be used with another implementation to yield a still further implementation. Thus, it is intended that the present disclosure cover such alterations, variations, and equivalents.

What is claimed is:

1. A computer-implemented method to perform malware detection via hierarchically-organized machine learning models, the method comprising:
   obtaining, by a computing system comprising one or more computing devices, a computer file to be analyzed for malware detection, wherein the computer file has a structure;
   parsing, by the computing system, the computer file into a plurality of file portions based on the structure of the computer file;
   respectively processing, by the computing system, the plurality of file portions with a plurality of machine-learned feature extractor models to respectively generate a plurality of feature embeddings respectively for the plurality of file portions, such that each file portion is processed by one of the machine-learned feature extractor models to generate one of the feature embeddings, and wherein each feature embedding comprises a numerical vector expressed within a latent space;
   combining, by the computing system, the plurality of feature embeddings within the latent space; and
   processing, by the computing system, the combination of the plurality of feature embeddings with a machine-learned prediction model to generate, as an output of the machine-learned prediction model, a model prediction for the computer file, wherein the model prediction is indicative of a malware classification for the computer file.

2. The computer-implemented method of claim 1, wherein:
   parsing, by the computing system, the computer file into the plurality of file portions based on the structure of the computer file comprises assigning, by the computing system, a respective portion class to each of the plurality of file portions; and the respective machine-learned feature extractor model used to process each file portion comprises a class-specific model trained specifically for the portion class assigned to the file portion.

3. The computer-implemented method of claim 1, wherein parsing, by the computing system, the computer file into the plurality of file portions based on the structure of the computer file comprises applying, by the computing system, a rule-based parsing engine that applies a plurality of user-defined parsing rules.

4. The computer-implemented method of claim 1, wherein each of the plurality of machine-learned feature extractor models comprises a convolutional neural network, and wherein the machine-learned prediction model comprises a transformer neural network.

5. The computer-implemented method of claim 1, wherein, for at least a first file portion of the plurality of file portions:

the method further comprises parsing, by the computing system, the first file portion into a plurality of file sub-portions; and processing, by the computing system, the first file portion with the respective machine-learned feature extractor model comprises:

respectively processing, by the computing system, the plurality of file sub-portions with a plurality of machine-learned feature extractor sub-models to respectively generate a plurality of intermediate feature embeddings respectively for the plurality of file sub-portions; and processing, by the computing system, the plurality of intermediate feature embeddings with a feature aggregation model to generate the feature embedding for the first file portion.

6. The computer-implemented method of claim 1, wherein the model prediction comprises a binary or logistic malware classification for the computer file.

7. The computer-implemented method of claim 1, wherein the model prediction comprises a multiclass malware family classification for the computer file.

8. The computer-implemented method of claim 1, wherein the model prediction comprises a functionality classification or an attribution classification for the computer file.

9. The computer-implemented method of claim 1, further comprising:

determining, by the computing system, that the computer file comprises malware based on the model prediction; and in response to determining that the computer file comprises malware: generating, by the computing system, a malware alert or performing, by the computing system, a malware response action.

10. One or more non-transitory computer-readable media that collectively store instructions that, when executed by one or more processors of a computing system, cause the computing system to perform operations, the operations comprising:

obtaining, by the computing system, a computer file, wherein the computer file has a structure;

parsing, by the computing system, the computer file into a plurality of file portions based on the structure of the computer file;

respectively processing, by the computing system, the plurality of file portions with a plurality of machine-learned feature extractor models to respectively generate a plurality of feature embeddings respectively for the plurality of file portions, such that each file portion is processed by one of the machine-learned feature extractor models to generate one of the feature embeddings, and wherein each feature embedding comprises a numerical vector expressed within a latent space;

combining, by the computing system, the plurality of feature embeddings within the latent space; and processing, by the computing system, the combination of the plurality of feature embeddings with a machine-learned prediction model to generate, as an output of the machine-learned prediction model, an output representation for the computer file.

11. The one or more non-transitory computer-readable media of claim 10, wherein:

parsing, by the computing system, the computer file into the plurality of file portions based on the structure of the computer file comprises assigning, by the computing system, a respective portion class to each of the plurality of file portions; and the respective machine-learned feature extractor model used to process each file portion comprises a class-specific model trained specifically for the portion class assigned to the file portion.

12. The one or more non-transitory computer-readable media of claim 10, wherein parsing, by the computing system, the computer file into the plurality of file portions based on the structure of the computer file comprises applying, by the computing system, a rule-based parsing engine that applies a plurality of user-defined parsing rules.

13. The one or more non-transitory computer-readable media of claim 10, wherein each of the plurality of machine-learned feature extractor models comprises a convolutional neural network and the machine-learned prediction model comprises a transformer neural network.

14. The one or more non-transitory computer-readable media of claim 10, wherein, for at least a first file portion of the plurality of file portions:

the operations further comprise parsing, by the computing system, the first file portion into a plurality of file sub-portions; and processing, by the computing system, the first file portion with the respective machine-learned feature extractor model comprises:

respectively processing, by the computing system, the plurality of file sub-portions with a plurality of machine-learned feature extractor sub-models to respectively generate a plurality of intermediate feature embeddings respectively for the plurality of file sub-portions; and processing, by the computing system, the plurality of intermediate feature embeddings with a feature aggregation model to generate the feature embedding for the first file portion.

15. The one or more non-transitory computer-readable media of claim 10, further comprising:

using, by the computing system, the output representation for the computer file to perform a downstream task for the computer file, wherein the downstream task comprises a similarity search task or an anomaly detection task.

16. A computing system to train a set of hierarchically-organized machine learning models for malware detection, the computer system comprising one or more processors and one or more non-transitory computer-readable media that collectively store instructions that, when executed by the one or more processors, cause the computing system to perform operations, the operations comprising:

obtaining, by the computing system, a computer file, wherein the computer file has a structure, and wherein a ground truth label is associated with the computer file;

parsing, by the computing system, the computer file into a plurality of file portions based on the structure of the computer file;

respectively processing, by the computing system, the plurality of file portions with a plurality of machine-learned feature extractor models to respectively generate a plurality of feature embeddings respectively for the plurality of file portions, such that each file portion is processed by one of the machine-learned feature extractor models to generate one of the feature embeddings, and wherein each feature embedding comprises a numerical vector expressed within a latent space;

combining, by the computing system, the plurality of feature embeddings within the latent space; and processing, by the computing system, the combination of the plurality of feature embeddings with a machine-learned prediction model to generate, as an output of the machine-learned prediction model, a model prediction for the computer file, wherein the model prediction is indicative of a malware classification for the computer file;

evaluating, by the computing system, a loss function that generates a loss value based on a comparison of the model prediction for the computer file with the ground truth label for computer file; and modifying, by the computing system, one or more parameter values of the machine-learned prediction model and the plurality of machine-learned feature extractor models based on the loss function.

17. The computing system of claim 16, wherein:

parsing, by the computing system, the computer file into the plurality of file portions based on the structure of the computer file comprises assigning, by the computing system, a respective portion class to each of the plurality of file portions; and the respective machine-learned feature extractor model used to process each file portion comprises a class-specific model trained specifically for the portion class assigned to the file portion.

18. The computing system of claim 16, wherein parsing, by the computing system, the computer file into the plurality of file portions based on the structure of the computer file comprises applying, by the computing system, a rule-based parsing engine that applies a plurality of user-defined parsing rules.

19. The computing system of claim 16, wherein each of the plurality of machine-learned feature extractor models comprises a convolutional neural network and the machine-learned prediction model comprises a transformer neural network.

20. The computing system of claim 16, wherein, for at least a first file portion of the plurality of file portions:

the operations further comprise parsing, by the computing system, the first file portion into a plurality of file sub-portions; and processing, by the computing system, the first file portion with the respective machine-learned feature extractor model comprises:

respectively processing, by the computing system, the plurality of file sub-portions with a plurality of machine-learned feature extractor sub-models to respectively generate a plurality of intermediate feature embeddings respectively for the plurality of file sub-portions; and processing, by the computing system, the plurality of intermediate feature embeddings with a feature aggregation model to generate the feature embedding for the first file portion.

\* \* \* \* \*